Patented Aug. 25, 1936

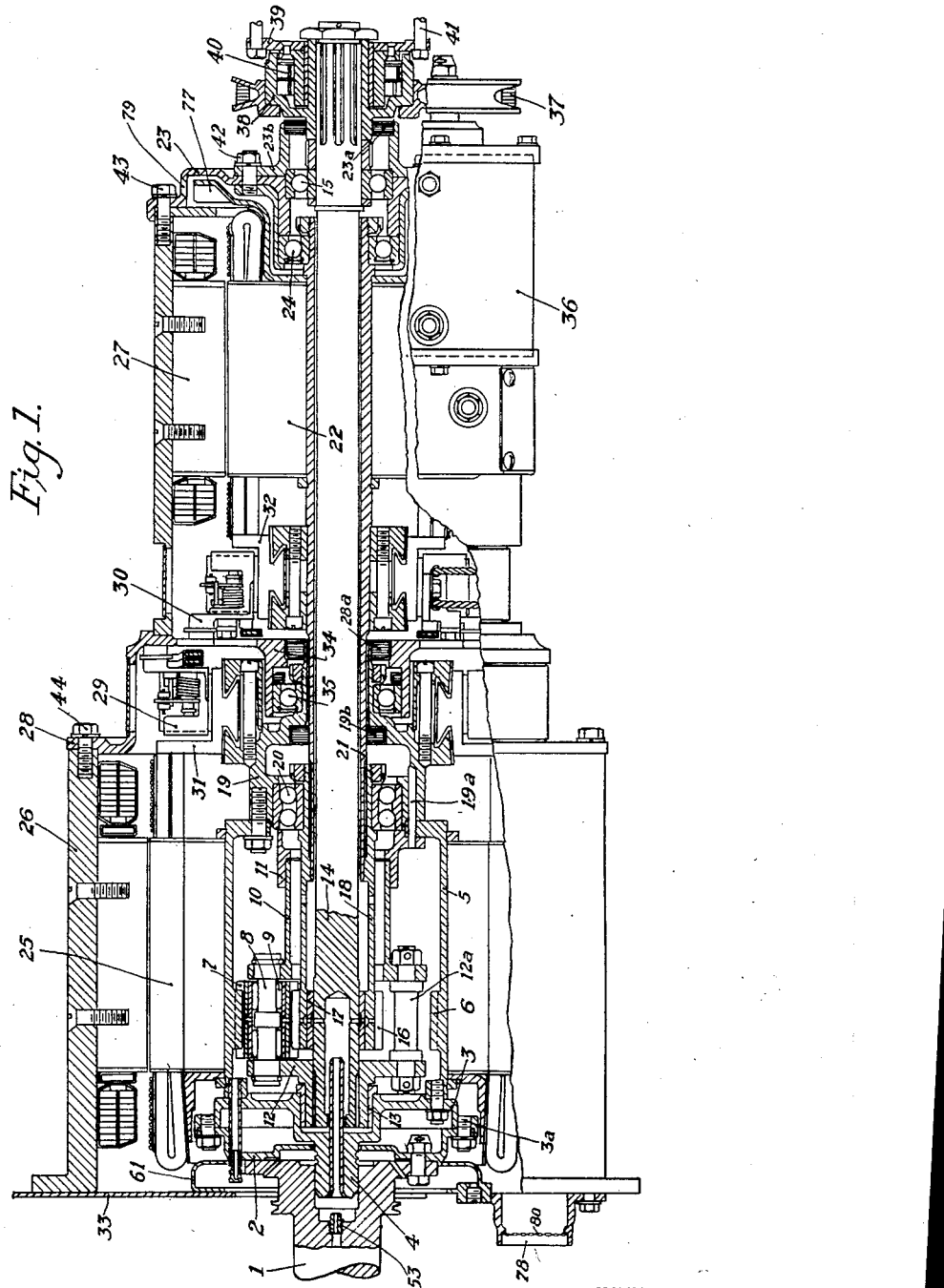

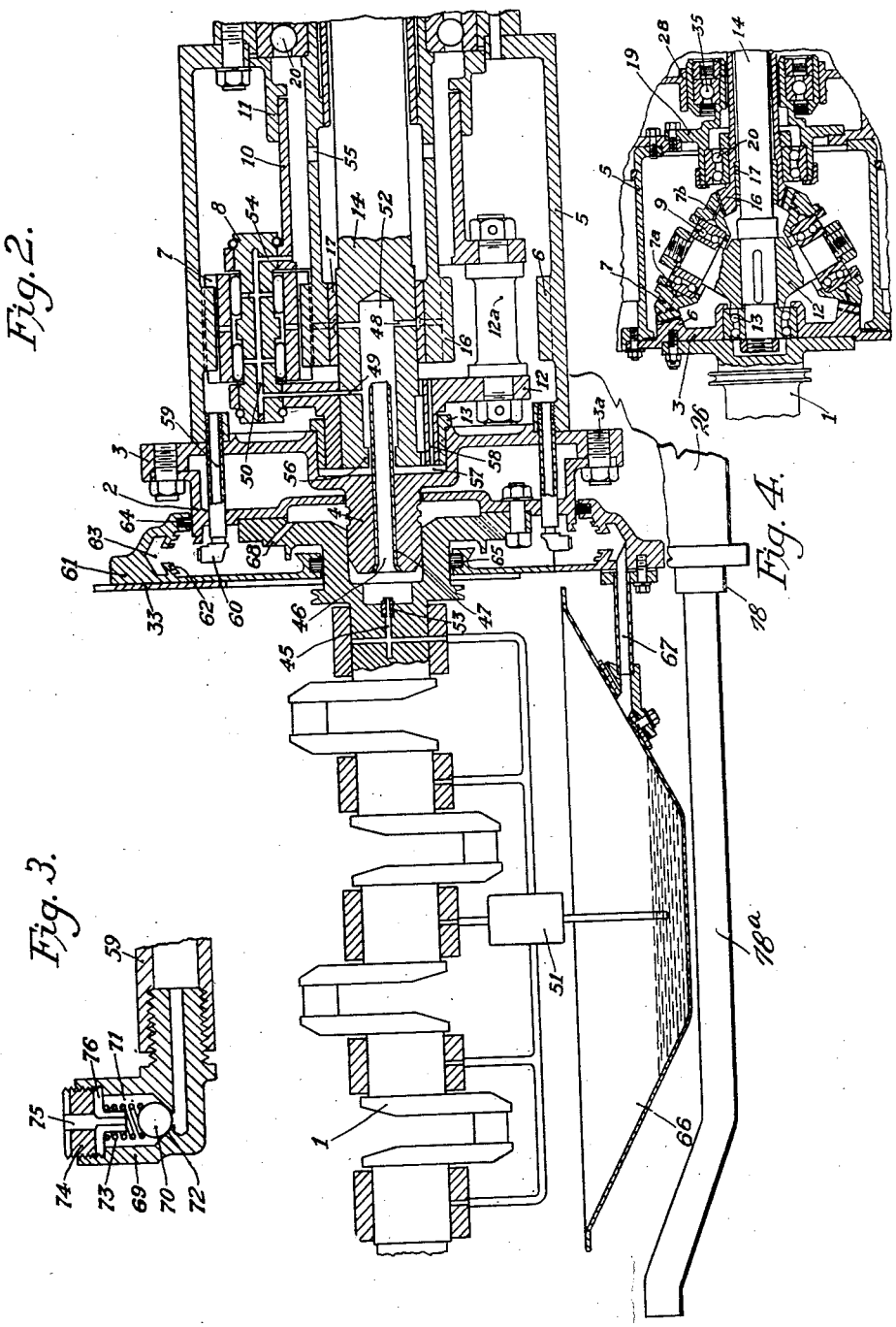

2,051,886

UNITED STATES PATENT OFFICE 2,051,886

TRANSMISSION SYSTEM AND GEARING LUBRICATION

Alfons H. Neuland, Irvington, N. J.

Application January 16, 1933, Serial No. 652,037

23 Claims. (Cl. 290—11)

My invention relates to electro-mechanical transmission systems employing gearing and to a method and means for lubricating the gearing.

An object of my invention is to provide a transmission in which the electrical elements of the system are combined with each other and with the gearing so as to secure space and weight economies and to facilitate the assembly of the component parts and in which the elements of the gearing are arranged to be held in rigid alignment with one another and in which the lateral thrust between the gears, and the load thrust between the planets and the spider is carried by anti-friction bearings. The lubrication of a planetary gear train is often unsatisfactory due to rotation of the planet gears and the spider which carries the planets, especially when they rotate at high speed as the centrifugal force of the rapidly rotating planets has a tendency to throw off any oil which may cling to the gear teeth and prevent the oil from reaching the planet gear bearings which often results in undue wear accompanied by objectionable noise and vibration.

This application is in part a continuation of my copending application Serial No. 508,094 filed January 12, 1931.

It is an object of my invention to provide effective lubrication for the gearing and further to combine a gearing with an internal combustion engine so as to employ a single oil pump for furnishing lubrication to the engine and the transmission.

Still another object is to provide a common oil reservoir for engine and transmission, and means whereby the oil from the engine oil pump may be transmitted to the transmission and returned to the engine without undue loss of the oil.

Still another object of the invention is to maintain a given oil level in the transmission and to prevent oil leakage.

A further object is to provide adequate ventilation of the electrical elements of the assembly.

Still other objects and advantages of my invention will appear from the following detailed description and appended drawings of a preferred embodiment which I have selected for illustration in which Figure 1 is in part a longitudinal section and in part a side elevation of an electrical transmission cooperating with a planetary gearing for transmitting power and shows particularly the general assembly of the electrical and mechanical elements.

Figure 2 is an enlarged section through the differential gearing of my transmission and shows particularly its connection to a crank shaft of an engine as well as the method by which the oil from the pump is supplied to the engine bearings as well as the connection between the engine and transmission oiling systems.

Figure 3 is an enlarged section of an oil check valve shown in Figure 2.

Figure 4 is a fragmentary sectional view of another form of my invention taken from my co-pending application identified above.

Referring to Figures 1 and 2 of the drawings in which like numerals identify like parts, I represents the crank shaft on the internal combustion engine having a drive flange 2 bolted to it. A flange 3 is in turn bolted to the drive flange 2 and is provided with a plug 4 slidingly fitted within the bore of the crank shaft 1. A drum 5 is secured to the flange 3, is provided with gear teeth 6 and forms an internal sun gear. A plurality of planet gears 7 mesh with the sun gear 6 and are arranged to be supported by the journal pins 8 preferably thru the needle rollers 9. The journal pins 8 have one of their ends secured to a flanged spider 10 supported by the bearing 11 and their other ends secured to a driving disc 12 of the planet spider journaled within the flange 3 by means of a bearing 13. The bore of the driving disc 12 is splined to form a driving connection with the load shaft 14 which extends thru the transmission and has its other end supported by the ball bearing 15. A small sun gear 16 meshes with the planet gears and is journaled with the shaft 14 by means of the bearing 17. Preferably, gears 6, 7 and 16 are provided with helical teeth for smooth and quiet operation. The sun gear 16 is provided with a sleeve extension 18 and is journaled within member 19 by means of the radial and thrust bearing 20. The sleeve 18 is provided with internal splines into which a sleeve 21 is fitted, establishing a driving connection between the sun gear 16 and an armature 22 which is secured to the sleeve 21 and journaled within the rear bracket 23 with the ball bearing 24. An armature 25 is secured to the drum 5 and cooperates with the field element 26 secured to the engine support plate 33. A second field element 27 is provided to cooperate with the armature 22 and secured to the field element 26 by the brush bracket 28. The brush bracket is provided with brushes 29 and 30 which collect current from the commutators 31 and 32 respectively. The brush bracket 28 is provided with an annular extension 34 which serves to rigidly support the drum 5 and armature 25 through the bearing 35. I provide a regulator generator 36 secured to the field element 27 and arranged to be driven from the load shaft 14 by the belt 37.

I shall not herein describe the operation of the electrical parts of my system as it is described in detail in my copending applications Serial No. 508,094, filed on January 12, 1931 and Serial No. 649,636, filed December 30, 1932.

I further provide a damper having an element 38 secured to the end of the load shaft 14 and having another member 39 secured to the propeller shaft, not shown, by means of the bolts 41. The two parts of the damper are yieldingly connected with one another by means of the springs 40. The damper serves to minimize gearing noise and vibration due to variations in the angular velocity of the internal combustion engine shaft with respect to the armature 22 and is fully described in my copending application Serial No. 649,637, filed on December 30, 1932.

The construction above described serves to rigidly support the ends of the two armatures and is well adapted to maintain rigidity and concentricity between the several elements of the gearing and to permit easy disassembly of the transmission. The shaft 14 including the damper and bracket 23 may be withdrawn as a unit by removal of the bolts 42 and 43 as the splined end of the shaft is slidingly fitted within the drive disc 12. Thereafter the rear unit including armature 22, field element 27 and brush bracket 28 can be separated from the front unit by the removal of the bolts 44, the assembly being arranged so that the splined end of the sleeve 21 can slide out of the gear sleeve 18 and so that the annular extension 34 will slide away from the outer race of the bearing 35. The entire transmission may be removed as a unit by removing the bolts securing the field 26 to the engine plate and the bolts 3a securing flanges 2 and 3 together. The shaft 14 and the damper may be removed as a unit by simply removing bolts 42. Also, by removing bolts 43, the unit assembly of shaft 14, armature 22 and the damper may be removed as a whole.

It will be noted that my construction also provides for an arrangement and combination between the elements of the gearing to reduce friction, to secure rigid alignment of the planets with the sun gears and to facilitate assembly of the gearing within the limited space provided by the hollow armature 25. For instance, I prefer the use of a single drum which serves as a shell for the armature 25, and by providing the drum with internal teeth cut around its inner circumference it is also made to serve as the sun gear for the differential gear train, the flanges provided at the ends of the drum facilitating the bolting of the commutator shell member 19 to one end, and the drive flange cover plate 3 to the other end so as to form a totally enclosed gear case. I also provide needle rollers 9 interposed between the journal pins 8, which serve as the inner races and the hardened bores or hardened steel liners in the planet gears which serve as the outer races. The ends of the race pins 8 are press-fitted into holes in the flanges of the planet carrier flanges which latter are locked together and held in alignment by the spacers 12a, the bearings 11 and 13 permitting rotation of the spider planets with respect to the drum 5 and serving to insure rigid alignment between the planets and the internal gear. The shaft 14 is fitted within a concentric splined hole in the flange 12 and by means of the bearing bushing 17 holds the small sun gear 16 in rigid alignment with the planet gears. The sleeve 18 of gear 16 is locked within the inner race of the ball bearing 20 which is preferably of a combined radial and thrust type. It should be noted that this construction is particularly suited for use with helical tooth gears and that all lateral thrust resulting from the use of helical gears is carried by the anti-friction thrust bearing 20 interposed between the small and large sun gears, preventing all thrust between the planet gears and the spider, as the thrust from the large sun gear upon the planet in one direction is neutralized by an equal thrust from the small sun gear on the planet gears in the opposite direction. This arrangement has substantial advantages over that in which the thrust is taken up between the planet gears and the gear spider, in view of the limited space within the relatively small planet gears and the complication which results from the use of thrust bearings for each of the several planet gears.

My gear arrangement is also such as to facilitate assembly and disassembly of the several parts. For instance, the inner race of the thrust bearing 20 may be locked on the extreme end of the small sun gear sleeve 18, and its outer race locked in place by the flange of the spider bearing 11. The planet and spider assembly may then be inserted into the left end of the gear case, the flange at the left of the drum 5 being notched, not shown, in as many places as there are planet gears so as to permit the planets to enter the drum to mesh with the two sun gears the end of the annulus 19 to be slipped within the bearing 11. The drive flange 3 is then bolted into place and serves as a cover for tightly enclosing the gears, the bearing 13 within its bore fitting over the journal portion of the flange cover 3 and so insuring rigid alignment between planets and sun gears. It should be noted that separate bolts (not shown) may be used to lock bearing flange 11 in place in order when disassembling, not to disturb the bolts which lock the commutator shell 19 to the drum 5.

It is obvious that the flange on engine shaft 1 may be made of larger diameter and be bolted directly to flange 3 without the intermediate flange 2, or, if desired, the flange 3 also may be omitted and the engine shaft flange bolted directly to the end of drum 5. In the latter case the bearing 13 would be seated directly in the end of shaft 1 in the place of the plug 4. I prefer to use the flange 3, however, since it permits the assembly of the differential gear arrangement independently of the engine shaft.

I also provide holes 19a in the commutator shell 19 and in the bearing flange 11 which serve to return to the gear case any lubricant that may work through the bearing 20 and so prevent the lubricant from accumulating and working through the felt seal 19b secured to shell 19 and surrounding sleeve 21. Another felt seal 23a is carried by bracket 23 and surrounds the end of member 19 to prevent the loss of grease from bearing 35, the bearing being provided with a grease shield on the left to prevent the grease from reaching the commutator of armature 25. A third felt seal 23a is carried by flange cap 23b and bears against an extension of element 38 to prevent the escape of grease from bearings 15 and 24. Bearing 24 is provided with a grease shield on the left to prevent escape of grease.

Turning now to Figure 2 which shows particularly, an embodiment suitable for lubricating the transmission from the engine, I provide a hole 45 in the crank shaft and another hole 46 in the plug 4 into which is fitted a tube 47 extending into a hole drilled in the shaft 14 forming an oil reservoir 52. I provide radial holes 48 connecting with the reservoir 52 extending through the body of the gear 16, and holes 49 extending radially through the flange of the drive disc 12 which align with holes 50 drilled in the journal pins 8. By this means the oil pump 51 driven by the engine supplies oil under pressure to the engine bearings, a relatively small portion being forced through the reducing plug 53 into the reservoir 52 in the shaft 14 from which the centrifugal force on the rotating shaft 14 serves to conduct it through the gear teeth by way of the holes 48, some of the oil finding its way into the bearing 17, and any seepage through the bearing finding its way through the opening 55 to the inner surface of the spider sleeve 10, a portion reaching the bearing 11 and ball bearing 20, and another portion, also due to centrifugal force, finding its way through the hole 54 into the journal pin 8 and from there into the needle rollers of the planet gear 7. The holes 50 also serve to supply oil to the bearing pin 8 directly from the reservoir 52 by way of hole 49. A shoulder 56 is provided at the end of shaft 14 which maintains a layer of oil next to the walls of the reservoir 52 as long as the shaft rotates, and so insures a constant flow of oil to the gears and bearings as heretofore explained, the overflow being conducted through the space surrounding tube 47 into the pocket 51 and reaching the bearing 13, the surplus being expelled through the opening 58 into the gear case.

My invention provides for the maintenance of a predetermined oil level inside the gear drum 5. I provide conducting means for the oil such as the tubes 59 extending from the gear case 5 through the flanges 3 and 2, preferably fitted with check valves 60, the purpose of which will hereafter be more fully described.

I further provide a hollow ring or annular trough which may be formed as part of the engine block or which may take the form of the ring 61 shown in the drawing as secured to the engine support plate 33. The ring 61 may have a smooth inner surface as shown in Figure 1 or may be provided with grooves 62 and a center groove 63 as shown in Figure 2. These grooves aid to carry the oil to the bottom of the ring and prevent oil that may be expelled against the top of the ring from dropping on the revolving crank shaft and so to prevent excessive splashing and possible oil leakage. The ring 61 is preferably provided with a groove in which a felt ring 64 is inserted and fits around the drive flange 2 to provide an oil seal. The central part of the ring 61 may preferably be provided with an annulus having a groove in which another felt ring 65 is arranged to fit the crank shaft and so to prevent the oil from leaking out of the ring. The ring 61 is made of two parts, the lower part being secured to the upper part by bolts, not shown, so that by removing the lower part, the bolts 3a are made accessible and permit separation of the drive flanges 2 and 3 for the purpose of disassembly of the transmission from the engine. I provide a return passage connecting the bottom of the ring 61 with the engine oil pan 66 by means of the pipe 67. It will be seen that the rotating engine shaft drives the gear case 5 and operates the pump 51. Oil flows from the pump into the center of the transmission and after having lubricated the gears and bearings of the transmission reaches the inner surface of the gear housing 5 where due to centrifugal force a layer of oil builds up until it reaches a level determined by the location of the tubes 59 which may be so arranged or adjusted that the oil level will be sufficiently deep to permit immersion of the teeth of the planet gear 7, any surplus being expelled through the tubes 59 into the grooves of the ring 61, and as the oil collects in the bottom of the ring it is returned to the engine pan 66 and to the pump 51 through tube 67.

It is seen that a continuous stream of fresh oil is constantly supplied to the bearings and gears of the transmission irrespective of the speed of the rotating parts and that a predetermined oil level is maintained in the gear case by reason of the arrangement for returning any surplus oil back to the engine oil pan. I also provide a return for oil that may leak thru between the plug 4 and the bore of the crank shaft, including oil grooves in the plug 4 which throw the oil into a pocket of the drive flange 2 from where it is expelled into the ring 61 through the return holes 68 drilled in the crank shaft flange.

In order to retain the oil in the gear case 5 when the engine is stopped, I provide a check valve 60 secured to the ends of the tubes 59. It consists of a valve body 69 within which is arranged a ball 70 loosely fitted within the hole 71 and pressed against the seat 72 by the spring 73 seated against a plug 74 provided with a hole 75 and a transverse groove 76. When the gear case is standing still, the spring in the check valve forces the ball 70 against its seat and so prevents any oil from the gear case draining away, especially when the tube 59 happens to stop at the bottom, the tension of the spring being so chosen that when engine and oil pump 51 are in operation the centrifugal force on the ball 70 opens the valve and permits the surplus oil to be returned to the engine.

My construction also provides forced ventilation of the electric machines by means of the fan 77 secured to the rear of the clutch armature 22 which, when the armature 22 is in operation, establishes a vacuum within the transmission casing. I provide an intake opening 78 at the lower front end of the transmission into which air of relatively low temperature from the air-stream underneath the vehicle is drawn in. The brush bracket 28 is provided with a number of openings thru which the air drawn in through the intake is made to traverse the entire machine from the front to the rear where it is discharged through openings 79 formed in bracket 23. The fan 77 might be arranged in some other position and could be driven by armature 25, but since armature 22 is designed to operate at higher speeds than armature 25 I prefer the arrangement shown. In some instances it may be desirable to connect a tube 78a to the transmission air intake to extend to a point near the bottom of the radiator of the vehicle in which case the incoming air will have the temperature of the atmosphere and it will not be materially increased by the heat of the engine before reaching the transmission, and so will have the maximum cooling effect as it traverses the spaces separating the field coils from one another and from the armatures. A screen or filter 80 may be provided to keep out dust or to prevent water from splashing into the transmission.

In Fig. 4, I have illustrated another arrangement for lubricating the differential gearing, such arrangement being originally disclosed in my copending application Serial No. 508,094, filed January 12, 1930. In this figure parts having the same general function as corresponding parts in the other figures are indicated by like reference numerals. As will be seen, bevel gears are employed instead of spur gears and the sun gear 6 is formed on the flange 3; the flange of shaft 1 being bolted directly to flange 3. Planet spider 12 is keyed to load shaft 14, the left end of which is supported in a combined radial and thrust bearing 13 carried by flange 3. Planet gears 7 are journaled upon the arms of spider 12 by combined radial and thrust bearings 9. Sun gear 16 is journaled by bearing 17 upon shaft 14 and is also journaled in flange 19 by a combined radial and thrust bearing 20, which prevents relative displacement between the two sun gears. The terminal extension of flange 16 is supported from brush bracket (flange) 28 by an anti-friction bearing 35, in the same manner as in Fig. 1.

The arrangement shown in Fig. 4 is adapted for lubrication without the aid of external means. For this purpose the planet or intermediate gears 7 are provided with a groove or reservoir 7a and substantially radial holes 7b connecting the reservoir with the spaces between the gear teeth. By these means the lubricant, which due to centrifugal force during engine rotation hugs the inner wall of the drum 5, is pumped into the holes and the reservoir and due to centrifugal force acting on the rotating gear 7, is expelled against the teeth of the sleeve gear 16, thereby keeping it lubricated.

In instances when the relative gear speed is high or when greater lubrication effectiveness for the small gear is desired, I provide closely fitted shields, not shown, on one or both sides of the intermediate gears which operate to hold the lubricant between the teeth of the intermediate gears in spite of the centrifugal force acting thereon and to conduct the lubricant to the small gear.

It will be understood that in one stage of operation the dynamo 22—27 is driven as a generator by the engine and supplies a reaction force against which the engine drives the load shaft through the differential gearing. In another stage, the dynamo 22—27 is driven as a motor from dynamo 25—26 and supplies a driving force to the small sun gear, which force cooperates with force supplied to the large sun gear by the engine in driving the load shaft 14. In the appended claims the dynamo 22—27 will be referred to as a power device or element and this term is used broadly to indicate a device which either absorbs power from the differential gear or delivers power to it. While my invention as shown operates as an electro-mechanical transmission system, it may be used as a purely mechanical transmission system by replacing armature 22 with a mechanical variable power absorbing device such as a friction brake or the like.

While I have herein shown a complete system embodying my invention and described its operation in connection with a motor vehicle, I desire to have it understood that my invention is adapted for other uses and that it may be used in whole or in part, depending upon the requirements to be met, in the described or other embodiments within the principle and scope of my invention, and I desire that only limitations required by the prior art or the appended claims be imposed upon it.

I claim:

1. In combination, a dynamo having a stationary field structure and a rotatable armature, a differential gearing embodied in said dynamo structure having one element connected to said armature, a second dynamo axially aligned with the first dynamo and having a stationary field structure secured to the field of the first dynamo, an armature for the second dynamo having a hollow shaft connected to a second element of said differential gearing, and a load shaft arranged within said hollow shaft and having a splined connection with the third element of said differential gearing whereby said load shaft may be disconnected from said gearing without dismantling said dynamos.

2. In combination, a dynamo having a stationary field structure and a rotatable armature, a differential gearing embodied in said dynamo structure having one element connected to said armature, a second dynamo axially aligned with the first dynamo and having a stationary field structure secured to the field of the first dynamo, an armature for the second dynamo having a hollow shaft journaled at one end in the end flange of said second dynamo and having a splined connection to a second element of said gearing, a load shaft within said hollow shaft and journaled to said end flange and having a splined connection to a third element of said gearing, whereby said end flange, second armature and load shaft may be removed as a unit from the dynamo structure and gearing.

3. In combination, a dynamo having a stationary field structure and a rotating armature journaled in said field structure, said armature including a hollow drum, a drive shaft connected to said drum, a differential gearing enclosed in said drum having one element driven by said drum, a second dynamo axially aligned with the first dynamo and having a stationary field structure secured to the field of the first dynamo, a hollow shaft connecting the armature of the second dynamo to a second element of the differential gearing, and a load shaft arranged within said hollow shaft and connected to the third element of said gearing, said hollow shaft and load shaft each including a splined connection whereby said second dynamo and load shaft may be disconnected as a unit from said first dynamo and differential gearing.

4. In combination, a drive shaft, a power device axially aligned with said drive shaft, a differential gear arranged between said drive shaft and said power device having one of its elements connected to said drive shaft, a hollow shaft connecting said power device to one of the elements of said differential gearing, a load shaft within said hollow shaft and connected to a third element of said differential gearing, said hollow shaft and load shaft being provided with splined connections whereby said power device and load shaft may be disconnected as a unit from said differential gearing, the elements of said differential gearing being journaled independently of said hollow shaft and said load shaft.

5. A differential gearing comprising a large sun gear having internal helical teeth, a small sun gear having external helical teeth, and a planet spider carrying a plurality of planet gears arranged between said sun gears, and means for relieving thrust between the planet gears and the spider in either direction including a bi-lateral thrust bearing interposed directly between said sun gears, having the inner and the outer races locked against lateral movement in both directions with respect to the small and the large sun gears respectively.

6. A differential gearing comprising a large sun gear having internal helical teeth, a small sun gear having external helical teeth, a planet spider having a plurality of parallel arms carrying planet gears meshing with said sun gears, each of said planet gears being mounted upon said arms with roller bearings, and means for relieving thrust between the rollers and races of said bearings in either direction including a bi-lateral anti-friction thrust bearing arranged directly between said sun gears.

7. A differential gearing comprising a drum housing having helical teeth formed on the inside thereof forming a large sun gear, a hollow sleeve journaled in one end flange of said drum by a thrust bearing and carrying a small sun gear having helical teeth, a planet spider journaled in the other end flange of said drum and having a plurality of parallel arms carrying planet gears cooperating with said sun gears, an annular flange surrounding said hollow shaft and connecting the free ends of said spider arms, said annular flange having a bearing connection with the first end flange, a load shaft arranged within said hollow sleeve and having a splined connection with said planet spider, a hollow shaft having a splined connection with said hollow sleeve and extending outside of said drum coaxially with said load shaft.

8. In combination, a dynamo having a stationary field structure and a rotating armature journaled in said field structure, said armature including a hollow drum, a drive shaft connected to said drum, a differential gearing enclosed in said drum having one element driven by said drum, a second dynamo axially aligned with the first dynamo and having a stationary field structure secured to the field of the first dynamo, a hollow shaft connecting the armature of the second dynamo to a second element of the differential gearing, a load shaft arranged within said hollow shaft and connected to the third element of said gearing, said hollow shaft and load shaft each including a splined connection whereby said second dynamo and load shaft may be disconnected as a unit from said first dynamo and differential gearing, said first armature having a commutator located adjacent the end of said drum and facing the second dynamo, the splined connection for said hollow shaft being located within said drum, means for supplying lubricant to the interior of the drum, and a lubricant seal carried by said drum and cooperating with said hollow shaft for preventing leakage of lubricant thru said splined connection from reaching said commutator.

9. In a power transmission system, an engine having an oil pump, a dynamo having an armature driven by said engine, a differential gearing having one element driven by said engine, a second dynamo having an armature connected to a second element of said gearing, a load shaft connected to a third element of said gearing, said gearing being embodied in the structure of one of said dynamos, and means for supplying oil to said gearing from said engine pump.

10. In combination, a driving member, a driven member, a rotatable gear case connected with one of the members, differential gears in said case and connecting the members including sun and planet gears, a rotatable spider for said planet gears, bearings for aligning said planet gears with said sun gears, a lubricant within said gear case, and pumping means for circulating the lubricant between radially separated points of the gear case and thru said bearings.

11. In combination, a driving member, a driven member, a rotatable gear case connected with one of the members, differential gears within said case and connecting the members including sun and planet gears, a rotatable spider and bearings for said planet gears, bearings for aligning the spider with the sun gears, a lubricant within the gear case, and means including a pump for overcoming the centrifugal force on the lubricant and for circulating the lubricant from an outer point of the case to a central point of the case and thru said bearings.

12. In combination, a driving member, a driven member, a rotatable gear case connected with one of the members, differential gears connecting the members including sun and planet gears, a rotatable spider and bearings for said planet gears, bearings for aligning the spider with said sun gears, a lubricant within the gear case subject to centrifugal force, an oil reservoir, means for pumping oil from the reservoir into a relatively central part of the gear case, means for circulating oil thru said bearings by centrifugal force, and means for expelling oil by centrifugal force from a radially distant point of the gear case.

13. In combination, a driving member, a driven member, a rotatable gear case connected with one of the members, differential gears connecting the members including sun and planet gears, a rotatable spider and bearings for said planet gears, bearings for aligning the spider with said sun gears, a lubricant within the gear case subject to centrifugal force, an oil reservoir, means for pumping oil from the reservoir into a relatively central part of the gear case, means for circulating oil thru said bearings by centrifugal force, and means for expelling oil by centrifugal force from a radially distant point of the gear case, and means for collecting said expelled oil and returning it to said reservoir.

14. In combination, a driving member, a driven member, a rotatable gear case connected with one of the members, differential gears connecting the members including sun and planet gears, a rotatable spider and bearings for said planet gears, bearings for aligning the spider with said sun gears, a lubricant within the gear case subject to centrifugal force, an oil reservoir, means for pumping oil from the reservoir into a relatively central part of the gear case, means for circulating oil thru said bearings by centrifugal force, and means for expelling oil by centrifugal force from a radially distant point of the gear case, said last means including a check valve biased to closed position to normally prevent discharge of said oil and being operated to open position by centrifugal force to permit the discharge of oil during rotation of said case.

15. In combination, a engine having an oil pump and an oil supply system including an oil duct formed in the engine shaft, a rotatable gear casing driven by said shaft including a duct connecting said first duct with the interior of said casing, and a throttling orifice included in one of said ducts to prevent relief of pressure in the engine oil supply system.

16. In a vehicle transmission system, an engine located near the front of the vehicle, a dynamo driven by the engine and located to the rear of the engine, a second dynamo enclosed in a common housing with the first dynamo and cooperating therewith to drive the vehicle, said housing being provided with an air inlet located forward of the engine and an outlet at its rear, and a fan within said housing and driven by one of said dynamos for passing air thru both dynamos from front to rear.

17. In combination, a dynamo having a stationary field structure and a rotatable armature, a differential gearing embodied in said dynamo structure and having one element connected to said armature, a second dynamo axially aligned with the first dynamo and having a stationary field structure secured to the field of the first dynamo to form a common enclosing housing for said dynamos, an armature for the second dynamo having a hollow shaft connected to a second element of said gearing, a load shaft within said hollow shaft and connected to a third element of said gearing, said hollow shaft and load shaft each having a splined connection whereby the second dynamo and load shaft may be removed as a unit from the first dynamo and gearing, said common housing being provided with an air inlet at one end adjacent the first dynamo and an air outlet at the other end, and a fan driven by one of said armatures for passing air through said dynamos.

18. A differential gearing comprising a large sun gear having helical teeth, a planet gear having helical teeth meshing with said sun gear, a planet carrier for said planet gear, and means for relieving lateral thrust between the planet gear and the planet carrier in either direction including a two-direction anti-friction thrust bearing having its outer race locked against axial movement in either direction with respect to the large sun gear, and its inner race locked against axial movement in either direction with respect to the small sun gear adapted to take up thrust between the sun gears in either direction.

19. In combination, a drive shaft, a load shaft axially aligned with said drive shaft, a differential gear arranged between said shafts, bearings for rotatably supporting the planet spider of the differential gear by said drive shaft, said load shaft having a splined connection with said spider, whereby said differential gearing is supported independently of the load shaft and said load shaft may be removed without dismantling said gearing.

20. In combination, a gear, a rotatable housing enclosing said gear, means for supplying oil to the interior of said gear housing during rotation, and means operable during rotation of said housing for withdrawing the oil from said housing at a point near the periphery thereof and for returning the same to said supplying means.

21. In combination, a driving member, a driven member, a rotatable gear case connected with one of the members, gears within said case connecting said members, an oil reservoir, means for pumping oil from the reservoir into a relatively central part of the gear case, and means for expelling oil by centrifugal force from a radially distant point of the gear case, and means for collecting said expelled oil and returning it to said reservoir.

22. In combination, an engine having a shaft with an oil supply duct formed therein, an oil pump connected to said duct, an oil reservoir connected with said oil pump, a gear casing secured to the engine shaft to rotate therewith, a gear train within said rotatable casing, means for connecting said oil duct with the interior of said casing, means for conducting the oil to the gearing by centrifugal force, means for expelling oil from the rotatable casing and means for returning said oil to the oil reservoir.

23. In combination, a drive shaft, a load shaft, a gearing interposed between the shafts including a large gear and a small gear, a gear case arranged to surround said gears and connected to one of the shafts to rotate therewith, a gear lubricant within the gear case, and an intermediate gear meshing with the large and small gears, said intermediate gear having a lubricant reservoir formed therein and ducts connecting said reservoir with the spaces between the teeth on said gear, whereby upon rotation of said gears the teeth of the large gear force lubricant into said reservoir and lubricant is conveyed by said ducts to said small gear.

ALFONS H. NEULAND.